United States Patent
Ryan et al.

(10) Patent No.: US 9,765,231 B1
(45) Date of Patent: Sep. 19, 2017

(54) PRIMER COMPOSITION

(75) Inventors: Steven G. Ryan, Northfield, MN (US); Douglas Allard Merrifield, Glastonbury, CT (US)

(73) Assignee: MAD DOG PAINT PRODUCTS, INC., Northfield, MN (US)

( * ) Notice: Subject to any disclaimer, the term of this patent is extended or adjusted under 35 U.S.C. 154(b) by 452 days.

(21) Appl. No.: 12/183,668

(22) Filed: Jul. 31, 2008

Related U.S. Application Data

(60) Provisional application No. 60/935,242, filed on Jul. 31, 2007.

(51) Int. Cl.
*C09D 133/08* (2006.01)
*C09D 133/10* (2006.01)
*C09D 133/12* (2006.01)
*C09D 133/14* (2006.01)
*C09D 133/18* (2006.01)
*C09D 133/20* (2006.01)
*C09D 123/14* (2006.01)

(52) U.S. Cl.
CPC ......... *C09D 133/08* (2013.01); *C09D 123/14* (2013.01)

(58) Field of Classification Search
CPC .. C09D 123/00; C09D 123/10; C09D 123/14; C09D 123/18; C09D 123/20; C09D 123/22; C09D 123/24; C09D 133/00; C09D 133/10; C09D 133/14; C09D 133/18; C09D 133/20; C09D 133/22; C09D 133/24
USPC ........ 524/556, 560, 570, 832, 823, 819, 562
See application file for complete search history.

(56) References Cited

U.S. PATENT DOCUMENTS

| | | | |
|---|---|---|---|
| 3,627,779 A | 12/1971 | Sandstedt | |
| 3,719,646 A | 3/1973 | Stecklen et al. | |
| 3,919,145 A | 11/1975 | Eckhoff | |
| 3,935,137 A | 1/1976 | Minkoff | |
| 4,001,159 A * | 1/1977 | Imai et al. | 524/161 |
| 4,108,811 A | 8/1978 | Eckhoff | |
| 4,191,796 A | 3/1980 | Eckhoff | |
| 5,387,635 A * | 2/1995 | Rowland et al. | 524/379 |
| 5,620,796 A * | 4/1997 | Kawabata et al. | 428/355 AC |
| 5,882,799 A * | 3/1999 | Roseboom et al. | 428/461 |
| 6,066,688 A * | 5/2000 | Samonides, Sr. | 524/272 |
| 6,228,935 B1 * | 5/2001 | Dunaway et al. | 524/832 |
| 6,465,589 B2 | 10/2002 | Inukai et al. | |
| 7,601,778 B2 * | 10/2009 | Matsunaga et al. | 524/505 |
| 2003/0153643 A1 * | 8/2003 | Jin et al. | 522/81 |
| 2005/0119400 A1 | 6/2005 | Ortmeier et al. | |
| 2006/0074181 A1 | 4/2006 | Eagan et al. | |
| 2007/0249778 A1 | 10/2007 | Clemens et al. | |
| 2008/0069949 A1 | 3/2008 | Glockner et al. | |

FOREIGN PATENT DOCUMENTS

JP 52003631 A 1/1977
WO WO 2004074374 A1 * 9/2004

OTHER PUBLICATIONS

Brandrup; Handbook of Polymers; Fourth Edition; 1999.*
Rohm and Haas Acrylate Specification; 2007.*

* cited by examiner

*Primary Examiner* — Karuna P Reddy
(74) *Attorney, Agent, or Firm* — Bracewell LLP; Brad Y. Chin

(57) ABSTRACT

A primer composition that resists peeling and cracking is provided that includes an acrylic copolymer having a Tg of between −15 and −35° C.

15 Claims, No Drawings

PRIMER COMPOSITION

CROSS REFERENCE TO RELATED APPLICATIONS

This application claims priority to U.S. Provisional Patent Application No. 60/935,242, entitled "Method of preventing peeling of old paint, cracking of old plaster and stucco, rusting of ferrous metals", filed on Jul. 31, 2007, which is incorporated herein by reference in its entirety.

FIELD OF THE INVENTION

The present invention relates to a composition useful as a primer or paint additive.

BACKGROUND OF THE INVENTION

Most paint primers, either oil-based or latex, become hard and brittle after about 12-24 months of first being applied. Typically, the substrate to which the primer is applied (e.g., wood, cinderblock, metal, stucco, plaster, etc.) flexes and moves as the temperature changes, whereas the primer, when hardened, does not flex or move in the same way. The primer on the substrate surface begins to crack and peel again. Furthermore, if the substrate is not sound, any paint applied as top coat over either the preceding paint or an applied primer will not last. Therefore, the customer can not expect the paint coating to last for nearly as long as the 20 year warranty that some manufacturers claim when the previous coatings continue to fail under the new coatings.

Thus, there exists a need for a composition for use as a primer that will resist hardening and stay flexible, thereby allowing the primer to move, expand and flex with the substrate to which it is applied

SUMMARY

A primer composition is provided that includes a pressure sensitive elastomeric resin that includes an acrylic-alkenyl copolymer having a Tg of between −10 and −45° C. In certain embodiments, the composition includes between about 45 and 65% by weight of the copolymer, preferably between about 50 and 55% by weight of the copolymer. In certain embodiments, the primer composition has a solids content of at least 50% by weight.

In another embodiment, a primer composition is provided having a pressure sensitive elastomeric resin, wherein the resin is an acrylic copolymer having a Tg of between about −15 and −35° C. The composition includes between about 45 and 65% by weight of the resin, a total solids content of at least 50% by weight, a total water content of at least 25% and a VOC content of no greater than 75 g/L. In certain embodiments, the copolymer is an acrylic-alkenyl copolymer.

DETAILED DESCRIPTION OF THE INVENTION

Provided herein are compositions useful as primers and paint additives that resist cracking and flaking, as well as methods of the use thereof.

In one aspect, the primer of the present invention includes a pressure sensitive elastomeric resin. In certain embodiments, the primer of the present invention includes an acrylic based resin. In certain other embodiments, the primer can include a resin that includes a copolymer prepared from acrylic monomers and alkenyl monomers. In certain embodiments, the alkenyl monomers include between 2 and 5 carbon atoms, preferably between 2 and 4 carbon atoms, and most preferably between 2 and 3 carbon atoms. Preferred alkenyl groups include one site of unsaturation per repeat unit. In certain other embodiments, the primer includes a resin that includes an acrylic-alkenyl copolymer, wherein the alkenyl group includes between 2 and 5 carbon atoms. In certain embodiments, the copolymer is a block copolymer. In other embodiments, the copolymer is a random copolymer. In certain embodiments, the alkyl group can be branched. In certain other embodiments, the alkyl group can be linear.

The copolymer can include between 1 and 99% by weight of an acrylic monomer, preferably between about 20 and 80% by weight, and more preferably between about 40 and 60% by weight. In certain embodiments, the composition includes between 1 and 99% by weight of the alkenyl monomer, preferably between about 20 and 80% by weight, and more preferably between about 40 and 60% by weight.

The primer composition can include between 1 and 99% by weight of the acrylic copolymer. In certain embodiments, the primer includes between 40 and 80% by weight of the acrylic copolymer, between 45 and 65% by weight of the acrylic copolymer, and preferably between about 50 and 55% by weight of the acrylic copolymer. In certain embodiments, the primer includes at least about 45% by weight and at least 45% by volume of the acrylic copolymer, more preferably at least about 50% by weight and by volume, and even more preferably at least about 55% by weight and by volume. In certain preferred embodiments, the primer composition includes between about 53 and 54% by weight and by volume of the acrylic copolymer.

In certain embodiments, the resin does not include any alkenyl groups having more than 4 carbon atoms. In certain embodiments, the resin does not include a urethane functional group. In certain embodiments, the resin does not include halogen atoms.

The hardness of the polymers employed in the resins for the manufacturing of primers and paints is measured on the Tg scale. A polymer having a positive (+) Tg is harder than a polymer having a negative (−) Tg. Typically, the Tg of normal primers and paints is about +20 on the Tg scale. Generally, if the painted substrate flexes more than the coating is able to flex, as is the case with coatings that have a high Tg, the coating will fail by eventually cracking and peeling. This lack of flexibility of the coating, whether a primer or a paint, is one reason why the primers and paints peel after multiple coats have been applied, and after years of expansion and contraction due to weather cycles.

In general, a low glass transition temperature (Tg) provides flexibility. In certain embodiments, the primer of the invention includes a resin having a Tg between about −12 to −45. In certain other embodiments, the primer includes a resin having a Tg between about −15 and −35. In other embodiments, the primer includes a resin having a Tg between about −15 and −30. In yet other embodiments, the primer includes a resin having a Tg between about −20 and −30.

The primer is a water based primer with minimal added chemicals. In certain embodiments, the VOC of the primer composition is less than about 100 g/L, preferably less than about 75 g/L, and more preferably less than about 50 g/L. Water content is at least about 15% by volume, more preferably at least about 20% by volume, and even more preferably at least 25% by volume.

A variety of additives can be included in the primer compositions of the present invention. For example, the primer composition can include, defoamers, dispersants (such as for example Hydro 44), preservatives (such as for example Busan 1024), cellulosic thickeners (such as for example 411FQ), flow thickeners (such as for example DSX 1525), film forming accelerants, pigments (including reactive pigments), coalescents (such as for example texanol), flash rust inhibitors and colorants. In certain embodiments, the primer composition can include one or more of the following: inhibitors, organic solvents, water-scavenging substances, surface-active substances, such as deaerating agents, lubricants, flow control agents, substrate wetting agents, antiblocking agents, oxygen scavengers, free-radical scavengers, catalysts, light stabilizers, color brighteners, photosensitizers, photoinitiators, other rheological additives such as thixotropic agents and/or thickeners, antiskinning agents, antistats, wetting agents, crosslinkers, preservatives, thermoplastic additives, plasticizers, matting agents, flame retardants, internal release agents, and blowing agents.

The pH of the primer is preferably basic. Exemplary primers have a pH of less than about 9. In certain embodiments, the pH of the primer is between about 7.5 and 8.5.

As noted previously, the primer described herein exhibits superior adhesion qualities. In certain embodiments, the primer has a pull off of at least about 200 psi, more preferably of at least about 250 psi, even more preferably of at least about 300 psi.

In certain embodiments, the primer can be tinted. In one embodiment, up to 2 oz/gal. of tint can be added. In certain other embodiments, up to 4 oz/gal of tint can be added. Compounds that may be added as a tint can include commercially available compounds, in aqueous and organic solvents, as obtained by, for example, Degussa Universal Colorants.

In certain embodiments, the primer described herein has a viscosity of between about 90 and 150 KU (Krebs Units, as measured at 70° F.). In certain embodiments, the primer has a viscosity of between about 95 and 125 KU. In yet other embodiments, the primer has a viscosity of between about 100 and 110 KU.

In one embodiment, the primer of the present invention includes at least one pressure sensitive elastomeric resin. In another embodiment, the primer of the invention includes a blend of pressure sensitive elastomeric resins. The pressure sensitive elastomeric resins demonstrate a high degree of flexibility and adhesivity and solve many paint related problems, such as for example, peeling and flaking paint, cracks in stucco and plaster, and rust. The use of pressure sensitive elastomeric resins reduces the likelihood of flaking and peeling of the paint, cracking of plaster and stucco, and rusting of underlying metal. In preferred embodiments, the primer of the present invention protects the underlying substrate and resists flaking, peeling and cracking for at least 5 years, preferably at least 10 years.

The adhesive properties of the pressure sensitive resins allow the primer adhere to surfaces, similar to glue. The elastomeric properties of the pressure sensitive resins allow for flexiblility in the films formed therefrom for many years. This flexibility is what allows the paint coating covering the primer and painted area to move with substrate as the substrate flexes and moves, instead of cracking and peeling off.

In contrast to many elastomeric products and coatings, which are generally thick, viscous and lay on top of the paint or substrate to which they are applied, in one embodiment, the primer formulation of the present invention has a low viscosity, thereby allowing the primer to penetrate into and around the surface to which it is applied, including into cracks and areas wherein the paint peeling. By deeply penetrating the substrate surface, primers of the present invention hold the peeling paint together, thereby preventing additional cracking and/or peeling. In certain embodiments, the primer can be applied to a painted surface, including painted surfaces that are already peeling and/or cracking. The pressure sensitive elastomeric resins described herein are tacky in nature and flexible.

In certain embodiments, the primer of the present invention prevents the formation rust on the metal surfaces, preferably for a period of at least 5 years, more preferably for a period of at least 10 years. As noted previously, as the primer coating ages, the coating does not harden and crack, as is common with many commercially available oil and latex primers and paints. The harder primers typically crack microscopically, thereby allowing moisture and oxygen to contact and react with the underlying metal substrate. The primer of the present invention, however, allows vapor to release out of the coating, while preventing the passage of moisture through the coating to the substrate surface below to cause oxidation and rust. Additionally, as noted previously, as the metal substrate flexes with the normal temperature changes, the primer of the present invention does not crack, instead remaining flexible and intact.

In certain embodiments of the present invention, the primer can be applied over unpainted surfaces, as well as surfaces that have been previously painted, including but not limited to: wood, ferrous metal, galvanized metal, plaster, stucco and concrete surfaces In certain embodiments, the wet film is applied having a thickness of at least about 4 mils. In certain preferred embodiments, the wet film is applied having a thickness of between about 5 and 10 mils. The dried film thickness preferably has a thickness of at least about 2 mils, preferably between about 2 and 6 mils, more preferably between about 2.2 and 5.5 mils.

In other embodiments, the primer described herein can be applied to horizontal wooden deck surfaces. Generally, horizontal deck surfaces are problematic for peeling paint, as deck surfaces frequently expand and contract due to the weather. In addition, added environmental stress from rain and snow sitting and ponding on top surface of a horizontal decks, accelerates the aging process.

In certain embodiments, a top coat of a latex or elastomeric paint or other compound can be applied to the primer described herein. Preferably, a 100% latex paint is applied to the primer described herein. The primer is tacky upon drying and preferably a top coat is applied within one week of the application of the primer.

The primer of the present invention can be applied to the above substrates following minimal surface preparation of sanding and scraping. Preferably, the surface is sanded and/or scraped prior to the application of the primer, although this is not required. Preferably, the surface to which the primer described herein is applied has a moisture content of less than 14%. For best performance, the paint is preferably applied in an ambient temperature of between 10° C. and 32° C. and the relative humidity is less than 80%. The primer can be applied by any known means, such as for example, brushing, rolling or spraying. For best results, the primer of the invention should be mechanically worked into the substrate by back brushing or a like technique to aid penetration into the surfaces desired to be stabilized.

In another aspect, the present invention provides a paint composition which provides an aqueous paint that provides a flexible coating having good adhesion and resists cracking. In certain embodiments, the paint composition showing improved

Example

In one exemplary formulation, preparation of 100 gal of the primer composition includes the following: 25 gal water; 1 lb defoamer; 8 lb dispersant; 1 lb preservative; 5 lb cellulosic thickener; 100 lb reactive pigment; 3 gal propylene glycol; 0.5 gal texanol; 600 lb pressure sensitive elastomeric resin; 2 lb defoamer; 0.37 lb sodium nitrite; 2 oz. colorant and 0.5 gal flow thicken.

Although the following detailed description contains many specific details for purposes of illustration, one of ordinary skill in the art will appreciate that many variations and alterations to the following details are within the scope of the invention. Accordingly, the exemplary embodiments of the invention described below are set forth without any loss of generality to, and without imposing limitations thereon, the claimed invention.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

The invention claimed is:

1. A paint primer composition for preparing a substrate to receive a paint layer, the paint primer composition comprising
   a pressure sensitive elastomeric resin, said resin comprising an acrylic-alkenyl copolymer comprising between 40 and 60% by weight acrylic monomer and between 40 and 60% by weight substituted-alkenyl monomer,
   wherein said acrylic-alkenyl copolymer is formed by a free radical copolymerization technique that randomly links the acrylic monomer and the substituted-alkenyl monomer,
   wherein said acrylic-alkenyl copolymer is a random copolymer having a Tg of between −10 and −45° C., and
   wherein the paint primer composition comprises greater than 75% and less than or equal to 85% by weight of the acrylic-alkenyl copolymer, a water content of at least 15%, and a VOC content of no greater than 75 g/l.

2. The paint primer composition of claim 1, wherein the VOC content is less than about 75 g/L.

3. The paint primer composition of claim 1, wherein the VOC content is less than about 50 g/L.

4. The paint primer composition of claim 1, wherein the pH of the composition is between about 7.5 and 8.5.

5. The paint primer composition of claim 1, wherein the viscosity of the composition as measured at 70° F. is between about 95 and 125 KU.

6. The paint primer composition of claim 1, wherein the viscosity of the composition as measured at 70° F. is between about 100 and 1.10 KU.

7. The paint primer composition of claim 1, wherein the Tg is between −15 and −35° C.

8. The paint primer composition of claim 1, wherein the Tg is between −20 and −30° C.

9. The paint primer composition of claim 1, wherein the copolymer does not comprise halogens.

10. The paint primer composition of claim 1, wherein the pull off strength for the removal of a primer composition film is greater than 300 psi.

11. The paint primer composition of claim 1, wherein said paint primer composition when applied to a surface is operable to provide a surface suitable for receiving a layer of paint applied thereto.

12. A paint primer composition for preparing a substrate to receive a paint layer thereon, the paint primer composition comprising:
    a pressure sensitive elastomeric resin, said resin comprising an acrylic-alkenyl copolymer comprising between 40 and 60% by weight acrylic monomer and between 40% to 60% by weight of a substituted-alkenyl monomer,
    wherein said acrylic-alkenyl copolymer is formed by a free radical copolymerization technique that randomly links the acrylic monomer and the substituted-alkenyl monomer,
    wherein said acrylic-alkenyl copolymer is a random copolymer having a Tg of between about −15 and −35° C., and
    wherein said paint primer composition comprises greater than 75% and less than or equal to 85% by weight of the resin;
    the paint primer composition further comprising:
    a water content of at least 15%; and
    a VOC content of no greater than 75 g/L.

13. The paint primer composition of claim 12 wherein the Tg is between −20 and −30° C.

14. The paint primer composition of claim 12, wherein the composition has a pH of between about 7.5 and 8.5.

15. The paint primer composition of claim 12, wherein the Tg is between about −20 and −30° C.

* * * * *